(12) United States Patent
Kusakari

(10) Patent No.: US 9,447,960 B2
(45) Date of Patent: Sep. 20, 2016

(54) LIGHTING FIXTURE AND POSITIONAL INFORMATION MANAGEMENT SYSTEM

(71) Applicant: Shin Kusakari, Kanagawa (JP)

(72) Inventor: Shin Kusakari, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 513 days.

(21) Appl. No.: 13/906,370

(22) Filed: May 31, 2013

(65) Prior Publication Data

US 2013/0329423 A1 Dec. 12, 2013

(30) Foreign Application Priority Data

Jun. 12, 2012 (JP) .................. 2012-133279

(51) Int. Cl.
- H04H 20/71 (2008.01)
- F21V 33/00 (2006.01)
- F21V 23/00 (2015.01)
- H05B 37/02 (2006.01)

(52) U.S. Cl.
CPC ............. *F21V 33/00* (2013.01); *F21V 23/003* (2013.01); *H05B 37/0227* (2013.01)

(58) Field of Classification Search
CPC ................................................. H05B 37/0227
USPC ....................................................... 455/3.01
See application file for complete search history.

(56) References Cited

U.S. PATENT DOCUMENTS

| | | | |
|---|---|---|---|
| 8,249,914 B2 | 8/2012 | Umeda | |
| 8,280,398 B2 | 10/2012 | Ishii et al. | |
| 2010/0141153 A1* | 6/2010 | Recker | H05B 33/0803 315/149 |
| 2012/0189313 A1* | 7/2012 | Pederson | H04B 10/1143 398/115 |
| 2013/0243040 A1 | 9/2013 | Kimura | |

FOREIGN PATENT DOCUMENTS

| | | |
|---|---|---|
| CN | 102170294 A | 8/2011 |
| EP | 2355067 A1 | 8/2011 |
| JP | 2005061934 A | 3/2005 |

(Continued)

OTHER PUBLICATIONS

Office Action for corresponding Chinese Application No. 2013102323741 dated Dec. 22, 2015 and English translation thereof.

(Continued)

*Primary Examiner* — Wesley Kim
*Assistant Examiner* — Raj Chakraborty
(74) *Attorney, Agent, or Firm* — Harness, Dickey & Pierce

(57) ABSTRACT

A lighting fixture has a lighting fixture body in which a light device is mounted, the lighting fixture body including a positional information transmission part that transmits positional information of the lighting fixture to a wireless terminal; a terminal information reception part that receives identification information of the wireless information and the positional information from the wireless terminal that has received the positional information; a terminal information transmission part that transmits the identification information and the positional information to a management server which manages a position of the wireless terminal; and a voltage conversion part that converts a voltage supplied by an external power source and supplies the converted voltage to the positional information transmission part, the terminal information reception part and the terminal information transmission part.

6 Claims, 16 Drawing Sheets

(56) References Cited

FOREIGN PATENT DOCUMENTS

| | | |
|---|---|---|
| JP | 2005-158007 | 6/2005 |
| JP | 2010040502 A | 2/2010 |
| JP | 2012109903 A | 6/2012 |
| WO | 2005/086375 A1 | 9/2005 |

OTHER PUBLICATIONS

U.S. Appl. No. 13/795,383, filed Mar. 12, 2013.
U.S. Appl. No. 13/784,961, filed Mar. 5, 2013.
Office Action for corresponding Japanese Application No. 2012-133279 dated May 10, 2016.

* cited by examiner

FIG.13

| FLOOR NUMBER | LATITUDE | LONGITUDE | BUILDING NUMBER |
|---|---|---|---|
| 16 | 35.459555 | 139.387110 | C |

FIG.14

| FLOOR NUMBER | LATITUDE | LONGITUDE | BUILDING NUMBER |
|---|---|---|---|
| 16 | 35.459555 | 139.387110 | C |

FIG.15

| FLOOR NUMBER: 9 BITS | LATITUDE: 21 BITS | LONGITUDE: 21 BITS | BUILDING NUMBER: 8 BITS |
|---|---|---|---|

FIG.16

| IDENTIFICATION INFORMATION | LATITUDE | LONGITUDE | FLOOR NUMBER | BUILDING | RECEIVED DATE AND TIME | APPARATUS NAME | DEPARTMENT |
|---|---|---|---|---|---|---|---|
| 002673abcdef01 | 35.459555 | 139.387110 | 16 | C | 11/12/12 13:30:01 | PJ WX4310 | SALES DEPT. 1 |
| 002673abcdef02 | 35.459483 | 139.388437 | 4 | A | 11/12/12 13:30:03 | UCS P3000 | SALES DEPT. 1 |
| .. | .. | .. | .. | .. | .. | .. | |
| .. | .. | .. | .. | .. | .. | .. | |

FIG.18

| LOCATION SEARCH SYSTEM | |
|---|---|
| DEPARTMENT | APPARATUS NAME |
| SALES DEPT. 1 | PJ WX4310 |
| | UCS P3000 |
| | .. |
| SALES DEPT. 2 | PJ WX3231N No.1 |
| | PJ WX3231N No.2 |
| | PJ WX3231N No.3 |

SEARCH EXECUTION

LIGHTING FIXTURE AND POSITIONAL INFORMATION MANAGEMENT SYSTEM

BACKGROUND OF THE INVENTION

1. Field of the Invention

The present invention relates to a lighting fixture and a positional information management system.

2. Description of the Related Art

Various positional information management systems have been proposed to determine and manage the position of a wireless terminal, or a person or a thing which has a wireless terminal, in such a facility or the like in which it is difficult to accurately carry out positioning using GPS or the like.

In such a positional information management system, plural transmitters for transmitting positional information to the wireless terminals are installed on the ceiling of a room or the like for example. However, for this purpose, new power supply installation work is needed for supplying power to the transmitters, and thus, the introduction cost may be increased.

International Patent Publication No. 2005/086375 discloses a system in which the position of the wireless terminal is determined as a result of the wireless terminal receiving unique information from a lighting fixture and transmitting the unique information to a server. According to the system of International Patent Publication No. 2005/086375, communication with the wireless terminal is made available using the power supplied to the lighting fixture as a result of providing the lighting fixture with a function of transmitting the unique information to the wireless terminal. Thus, it is not necessary to carry out new power supply installation work at a time of introducing the system.

However, power consumption of the wireless terminal may be increased depending on the communication system employed between the wireless terminal and the server according to the system of International Patent Publication No. 2005/086375. Further, the server needs to search for the position associated with the unique information in order to determine the position of the wireless terminal, and the calculation cost may be thus increased. Further, in a case where the transmitter transmitting the unique information to the wireless terminal is provided in a lamp, the running cost may be increased since the transmitter should be replaced together with the lamp when the lamp has been broken down or come to the end even though the transmitter itself can be further used.

SUMMARY OF THE INVENTION

A lighting fixture according to one aspect of the present invention is a lighting fixture having a lighting fixture body in which a light device is mounted. The lighting fixture body has a positional information transmission part that transmits positional information of the lighting fixture to a wireless terminal; a terminal information reception part that receives identification information of the wireless terminal and the positional information from the wireless terminal that has received the positional information; a terminal information transmission part that transmits the identification information and the positional information to a management server which manages a position of the wireless terminal; and a voltage conversion part that converts the voltage of the power supplied by an external power source and supplies the converted voltage to the positional information transmission part, the terminal information reception part and the terminal information transmission part.

Other objects, features and advantages of the present invention will become more apparent from the following detailed description when read in conjunction with the accompanying drawings.

BRIEF DESCRIPTION OF THE DRAWINGS

FIG. 13 shows an example of information that the lighting fixture according to the first embodiment has;

FIG. 14 shows an example of information that the wireless terminal according to the first embodiment has;

FIG. 15 shows an example of a format of positional information that the wireless terminal according to the first embodiment transmits:

FIG. 16 shows an example of information that the management server according to the first embodiment has;

FIG. 18 shows an example of a search screen page of the management server according to the first embodiment.

DETAILED DESCRIPTION OF THE EMBODIMENTS

Below, the embodiment will be described using figures, in the order of "1. System", "2. Hardware Configuration Example", "3. Function" and "4. Operational Sequence".

(1. System)

Figure 1:
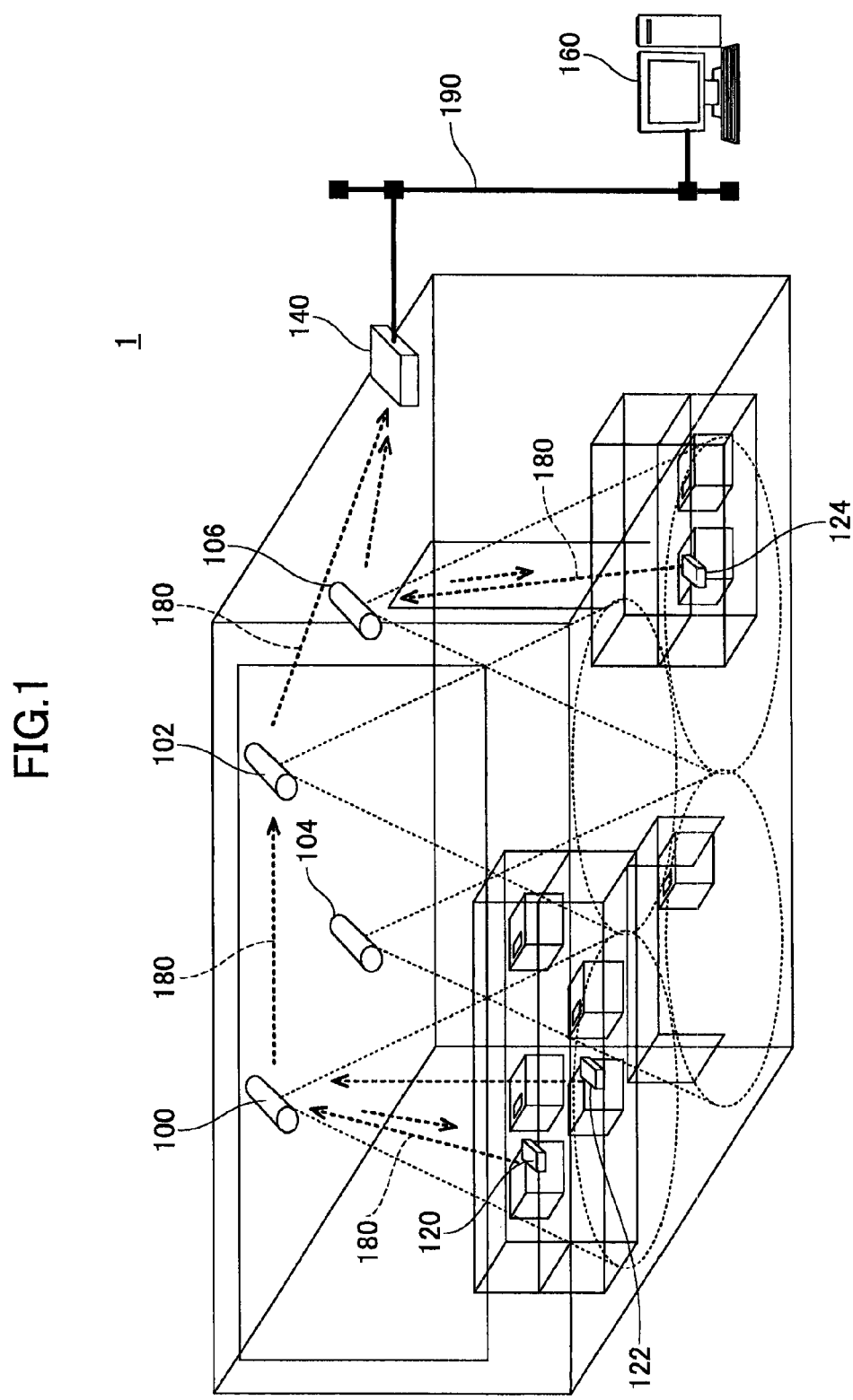
FIG. 1 shows a positional information management system according to a first embodiment.
Figure 2:
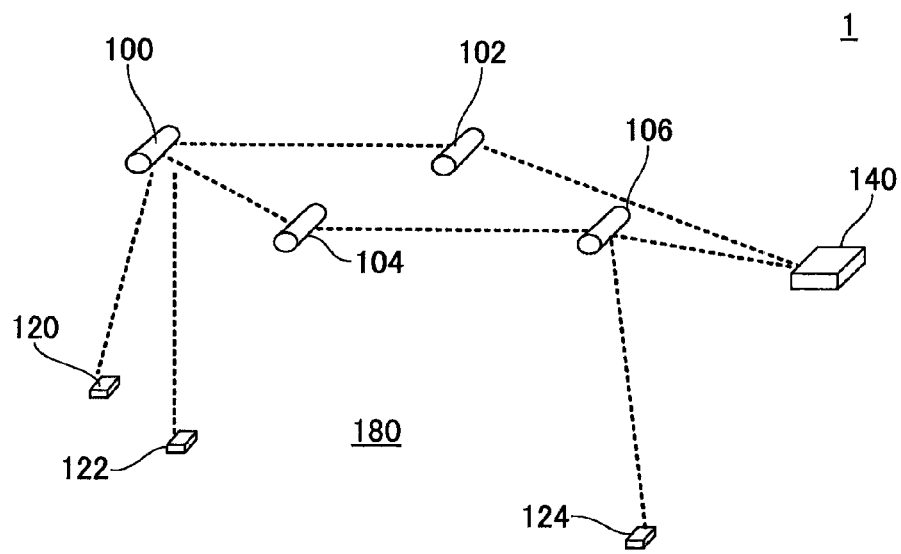
FIG. 2 shows a network included in the positional information management system according to the first embodiment.

FIG. 1 shows a positional information management system 1 according to the first embodiment. The positional information management system 1 includes lighting fixtures 100, 102, 104 and 106; wireless terminals 120, 122 and 124; a management apparatus 140, a management server 160; a network 180 including the lighting fixtures 100, 102, 104 and 106, the wireless terminals 120, 122 and 124 and the management apparatus 140; and a network 190. The network 180 is a wireless network managed by the management apparatus 140. FIG. 2 shows the lighting fixtures 100, 102, 104 and 106, the wireless terminals 120, 122 and 124 and the management apparatus 140 included in the wireless network 180 extracted from FIG. 1.

The lighting fixtures 100, 102, 104 and 106 are mounted, for example, on a ceiling of a room, and have light devices 150 such as lamps mounted therein, respectively (see FIG. 3 described later). Each of the lighting fixtures 100, 102, 104 and 106 continuously or intermittently transmits, in a wireless manner, positional information of itself (hereinafter, simply referred to as "positional information") such as longitude and latitude information, a building number and a floor number of a building and/or the like concerning the position at which the corresponding one of the lighting fixture 100, 102, 104 and 106 is installed. The lighting fixtures 100, 102, 104 and 106 thus transmit the sets of positional information, which the lighting fixtures 100, 102, 104 and 106 respectively have, to predetermined areas using wireless signals, respectively. The predetermined areas are limited by signal strengths of the used wireless signals, respectively. The lighting fixtures 100, 102, 104 and 106 are placed at positions to cover zones that are targets to manage positions, respectively, and are defined so that the respective zones do not overlap each other. Alternatively, even in a case where the zones overlap each other, a configuration is provided such that a part that receives the positional information can identify the corresponding lighting fixture based on the strength of the received radio waves. In the example of FIG. 1, conical broken lines shown below the respective lighting fixtures 100, 102, 104 and 106 show the predetermined areas. As the communication method to transmit the positional information, for example, an indoor messaging system (IMES) may be used.

The wireless terminals 120, 122 and 124 can receive the wireless signals transmitted by the nearest ones of the lighting fixtures 100, 102, 104 and 106, respectively. In the example of FIG. 1, the respective wireless terminals 120, 122 and 124 are attached to management targets having shapes of rectangular parallelepipeds for which positions are to be managed, respectively. The wireless terminals 120, 122 and 124 are terminals that can transmit radio waves by themselves, and thus, are, for example, terminals such as active tags. Below, the wireless terminal 120 will be described as a typical one of the wireless terminals 120, 122 and 124. Each of the other wireless terminals 122 and 124 has generally the same configuration as that of the wireless terminal 120.

The wireless terminal 120 is within an area of being able to receive the wireless signal from the lighting fixture 100, and receives the positional information of the lighting fixture 100. The receiving the positional information of the lighting fixture 100 may be carried out by using IMES, for example. The wireless terminal 120 transmits information including the own identification information such as a network address to the lighting fixture 100 together with the received positional information. The transmitting is carried out using the network 180 that is according to short-range wireless communication such as IEEE 802.15.4 and ZigBee (registered trademark). In this case, as the identification information of the wireless terminal 120, a short address of IEEE 802.15.4 or an IEEE extended (MAC) address may be used. The identification information and the positional information thus transmitted to the lighting fixture 100 are then transmitted to the management apparatus 140 via the adjacent lighting fixture 102. It is noted that the transmitting and receiving operations of the wireless terminal 120 are carried out in predetermined timing or in timing when a change in the acceleration at the wireless terminal has been detected by an acceleration sensor that the wireless terminal 120 has.

The management apparatus 140 connects the network 180 and the network 190 together, and sends data transmitted from the network 180 to the network 190 by bridging therebetween. The management apparatus 140 is installed, for example, on each floor of the building, or in each room separated by walls or the like. In a case where the network 180 is a personal area network (PAN) according to IEEE 802.15.4 and ZigBee (registered trademark) and the network 190 is a local area network (LAN) based on the IEEE 802.3 standard, the communication system is converted therebetween. Further, in a case where the identification information of the wireless terminal 120 is expressed by a short address of IEEE 802.15.4, this is converted into the IEEE extended address based on the information used at the time of configuring the PAN, and then, the identification information is transmitted to the management server 160.

The management server 160 records the identification information and the positional information received via the management apparatus 140 together with the received date and time, and manages the positions of the corresponding ones of the lighting fixtures 100, 102, 104 and 106. In the management server 160, the management targets concerning the wireless terminals 120, 122 and 124 are previously recorded. Thus, by using the recorded information, the management server 160 can search for the locations (whereabouts) of the management targets.

That is, by thus managing the sets of identification information of the wireless terminals 120, 122 and 124 and the sets of positional information of the nearest ones of the lighting fixtures 100, 102, 104 and 106 to be associated with each other, respectively, the management server 160 can provide information indicating that the respective positions of the management targets (corresponding to the wireless terminals 120, 122 and 124) correspond to the positions of the lighting fixtures which are thus managed to be associated with the wireless terminals 120, 122 and 124 (corresponding to the respective management targets). For example, by managing the identification information of the wireless terminal 120 and the positional information of the lighting fixture 100 to be associated with each other, the management server 160 can provide information indicating that the position of the management target to which the wireless terminal 120 is attached corresponds to the position of the lighting fixture 100.

The network 180 is, for example, the PAN that meets the IEEE 802.15.4 and ZigBee (registered trademark) standards, which connects the respective lighting fixtures 100, 102, 104 and 106, wireless terminals 120, 122 and 124 and management apparatus 140. In the case where the PAN is configured according to the IEEE 802.15.4 and ZigBee (registered trademark) standards, the wireless terminals 120, 122 and 124, the lighting fixtures 100, 102, 104 and 106 and the management apparatus 140 have end device functions, router functions and a coordinator function defined by the ZigBee (registered trademark) standard, respectively. Then, the respective lighting fixtures 100, 102, 104 and 106 and wireless terminals 120, 122 and 124 become under the control of the management apparatus 140 at a time of being started up, and form the PAN, and the minimum paths (routes) thereof toward the management apparatus 140 are determined.

The network 190 is a network connecting the management apparatus 140 and the management server 160, and is, for example, a LAN defined by IEEE 802.3 standard.

As mentioned above, in the positional information management system 1 according to the first embodiment, the wireless terminals 120, 122 and 124 can transmit the identification information and the positional information to the management server 160 using the power only for being able to communicate with the nearest ones of the lighting fixtures 100, 102, 104 and 106, respectively. Further, the communication functions for communicating with the wireless terminals 120, 122 and 124 and the management apparatus 140 are provided in the lighting fixtures 100, 102, 104 and 106, respectively. Thus, it is not necessary to install a new infrastructure for supplying the power required for the communication functions, and thus, it is possible to reduce the introduction cost.

It is noted that it is also possible to transmit the positional information of the lighting fixtures 100, 102, 104 and 106 using the network 180. Thereby, the transmitting system such as IMES for transmitting the positional information becomes unnecessary.

Further, in a case where the management apparatus 140 exists nearer to the wireless terminal 120 than to the lighting fixture 100 that has transmitted the positional information thereto, the wireless terminal 120 may transmit the identification information and the positional information rather to the management apparatus 140 directly. Thereby, it is possible to transmit the identification information and the positional information to the management server 160 using the shortest path (route).

Further, it is also possible to integrate the function of the management apparatus 140 to the management server 160. Thereby, the separate management apparatus 140 becomes unnecessary.

The wireless terminals 120, 122 and 124 may be wireless terminals having functions equal to active tags such as smartphones, PDAs, PCs or smart meters. Thereby, it is possible to manage the positional information of the existing wireless terminals without attaching tags thereto.

Further, in addition to the above-mentioned positional information, it is also possible to include information for determining a finer position such as information indicating one of divisions inside a room. Thereby, it is possible to carry out position management more finely.

Further, the position management targets may be persons. Thereby, it is possible to manage the locations (whereabouts) of the persons by the system 1.

Further, the network 180 may be configured using short-range wireless communication such as Bluetooth, LE, ANT, Z-Wave or the like. Thereby, it is possible to manage the positional information of various wireless terminals.

Further, the network 190 may include plural networks such as the Internet, for example. Thereby, it is possible to manage the positional information of the wireless terminals without regard to the physical positional relationship between the network 180 and the management server 160.

(2. Hardware Configuration Example)

Next, the hardware configurations of the lighting fixture 100, the wireless terminal 120, the management apparatus 140 and the management server 160 included in the positional information management system 1 will be described.

Figure 3:
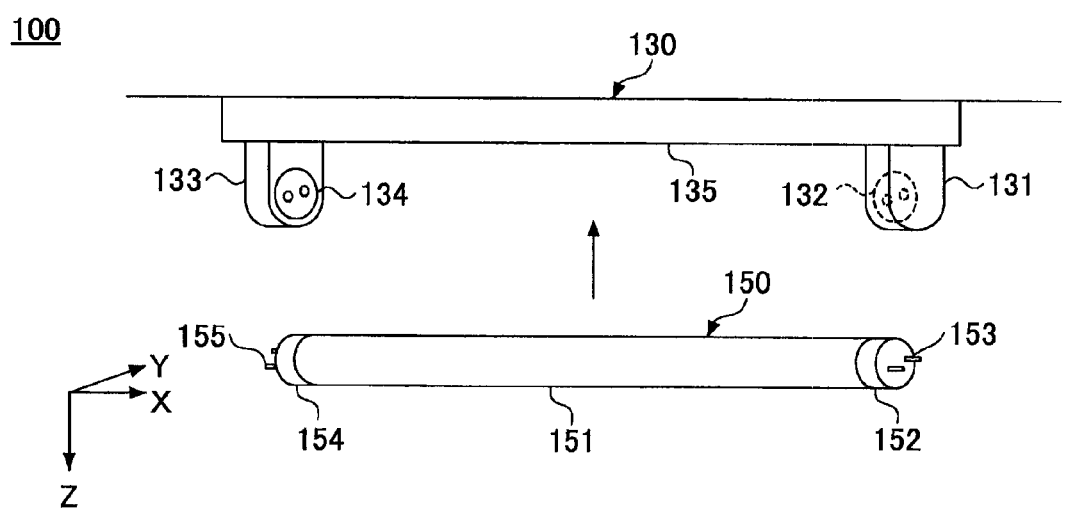
FIG. 3 illustrates an external appearance of a lighting fixture according to the first embodiment.

FIG. 3 illustrates an external appearance of the lighting fixture 100 according to the first embodiment. It is noted that the hardware configuration of the lighting fixture 100 will now be described as a typical example of the lighting fixtures 100, 102, 104 and 106, and each of the other lighting fixtures 102, 104 and 106 has generally the same hardware configuration as the lighting fixture 100. As shown in FIG. 3, the light device 150 is, for example, a straight-tube-type lamp, and is mounted in a lighting fixture body 130.

The lighting fixture body 130 is installed onto, for example, the ceiling of the room, and supplies the power to the light device 150 mounted therein. The lighting fixture body 130 includes a body 135 installed onto the ceiling or the like; a first socket 131 and a second socket 133 as examples of fixtures to which the ends of the light device 150 are mounted, respectively. The first socket 131 has a power supply terminal 132 for supplying the power to the light device 150. The second socket 133 has a power supply terminal 134 for supplying the power to the light device 150. The lighting fixture body 130 supplies the power to the light device 150, the two ends of which are mounted on the first socket 131 and the second socket 133, respectively, from a power supply part provided inside, via the power supply terminals 132 and 134. It is noted that the lighting fixture 100 may be configured in such a manner that a lamp having another shape, for example, a spherical shape, is mounted therein.

The light device 150 has a translucent cover 151, metal caps 152 and 154 provided at the ends, connection terminals 153 and 155, and a light source (described later using FIG. 4) inside. The translucent cover 151 is made of, for example, a resin material such as an acrylic resin, and covers the inside light source. The metal caps 152 and 154 will be mounted on the first socket 131 and the second socket 133 of the lighting fixture body 130, respectively. The connection terminals 153 and 155 are connected to the power supply terminals 132 and 134 when the light device 150 is mounted in the lighting fixture body 130, and receive the supplied power. The light source provided inside the light device 150 emits light by the power supplied from the connection terminals 153 and 155, and irradiates the light to the outside via the translucent cover 151.

Figure 4:
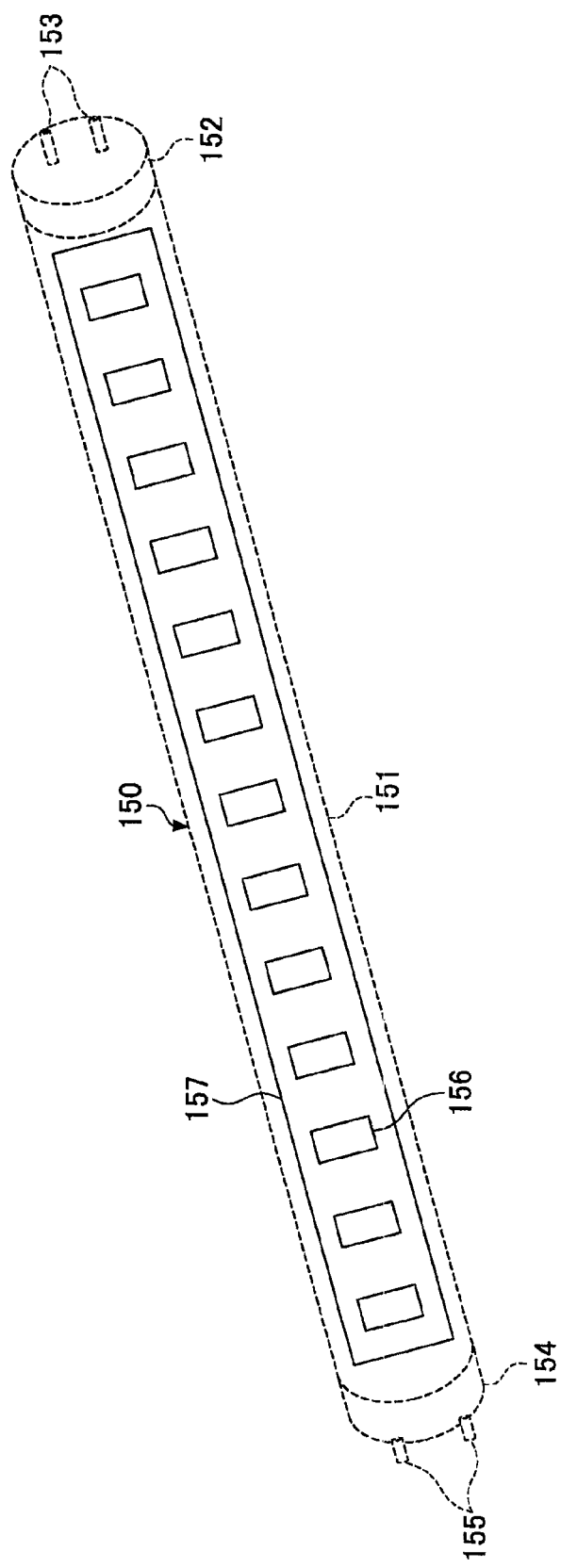
FIG. 4 illustrates a general configuration of a light device according to the first embodiment.

FIG. 4 illustrates a general configuration of the light source inside the light device 150 according to the first embodiment. The light device 150 has, as the light source, a substrate 157 on which LED elements 156 are mounted, as one example of a light emitting module, and irradiates light from the LED elements 156 to the outside. The LED elements 156 are arranged on one side of the substrate 157 along with the shape of the light device 150. The substrate 157 is mounted in the light device 150 in such a manner that when the light device 150 is mounted in the lighting fixture body 130, the side on which the LED elements 156 are mounted face the room inside from the body 135, for example. It is noted that as the light source, it is possible to thus employ semiconductor light emitting devices such as the LED elements, EL elements or the like. Further, although the light device 150 according to the first embodiment has the shape of the straight tube type, the shape of the light device 150 is not limited thereto. For example, as mentioned above, the light device 150 may have another shape such as a spherical shape. The shape of the substrate 157, the arrangement and/or the number of the LED elements 156, and so forth, may be appropriately set depending on the shape of the light device 150.

Figure 5:
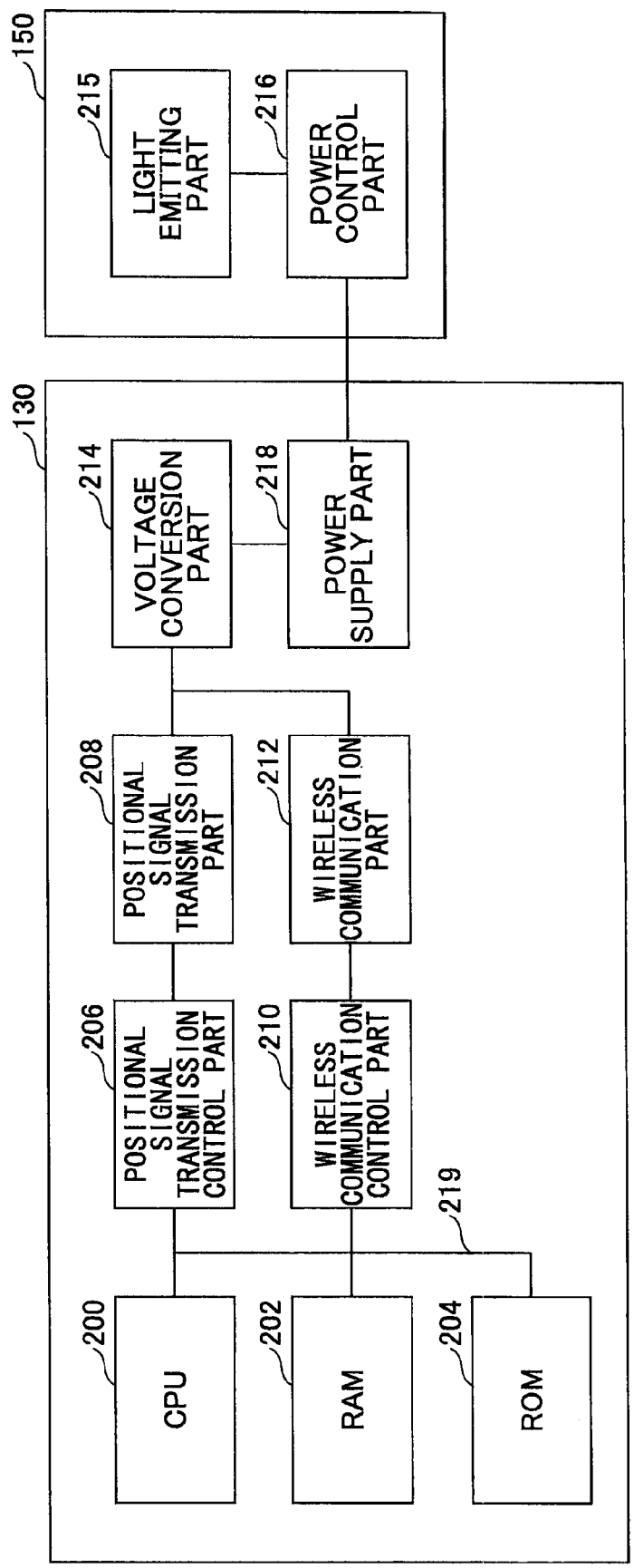
FIG. 5 is a hardware configuration diagram of the lighting fixture according to the first embodiment.

FIG. 5 shows a hardware configuration of the lighting fixture 100 according to the first embodiment. The lighting fixture body 130 of the lighting fixture 100 includes a CPU 200, a RAM 202, a ROM 204, a positional signal transmission control part 206, a positional signal transmission part 208, a wireless communication control part 210, a wireless communication part 212, a voltage conversion part 214, a power supply part 218 and a bus 219.

The CPU 200 executes a program prepared for carrying out control of the operations of communication and so forth of the lighting fixture 100. The RAM 202 provides a work area for the CPU 200, or the like. The ROM 204 stores the program that the CPU 200 executes and the positional information of the lighting fixture 100. The positional signal transmission control part 206 carries out a process for transmitting a positioning signal indicating the positional information of the lighting fixture 100 via the positional signal transmission part 208. The positional signal transmission part 208 is a device including an antenna transmitting the positioning signal such as an IMES signal, and transmits the positioning signal indicating the positional information of the lighting fixture 100 to the wireless terminal 120. The wireless communication control part 210 carries out a wireless communication process using the wireless communication part 212. The wireless communication part 212 is a device including an antenna capable of transmitting and receiving radio waves that meet IEEE 802.15.4 standard, for example. The wireless communication part 212 receives the identification information of the wireless terminal 120 and the positional information from the same wireless terminal 120 that has received the positioning signal, and transmits the received identification information and positional information to the management server 160 that manages the positions of the wireless terminals 120, 122 and 124, via the management apparatus 140. The voltage conversion part 214 includes, for example, an AC-DC converter and a step-down circuit, and converts the voltage supplied by the power supply part 218 into the voltage to be used for operating the positional signal transmission part 208 and the wireless communication part 212. The power supply part 218 is connected to, for example, a commercial power source, and supplies the power to the voltage conversion part 214 and a power control part 216 of the light device 150 that will be mounted in the lighting fixture body 130. The bus 219 electrically connects the above-mentioned respective parts.

By the above-mentioned configuration, the lighting fixture body 130 according to the first embodiment can transmit the positional information to the wireless terminal 120, receive the identification information and the positional information from the wireless terminal 120 and transmit these identification information and positional information to the management server 160 via the management apparatus 140. It is noted that plural voltage conversion parts 214 may be provided which supply different voltages to the positional signal transmission part 208 and the wireless communication part 212, respectively. Further, the respective parts that the lighting fixture body 130 has shown in FIG. 5 may actually be mounted in any one of the body 135, the first socket 131 and the second socket 133, or may be mounted in the body 135, the first socket 131 and the second socket 133, respectively, in a distributed manner. Further, the lighting fixture 100 may be configured to be an emergency light installed at an emergency exit or the like. Further, in a case where, as described above, the positional information is transmitted to the wireless terminal 120 using the wireless communication control part 210 and the wireless communication part 212, the positional signal transmission control part 206 and the positional signal transmission part 208 become unnecessary.

It is noted that the lighting fixture 100 has a light emitting part 215 and the power control part 216. The light emitting part 215 includes the substrate 157 on which the LED elements 156 are provided as shown in FIG. 4. The power control part 216 includes, for example, a smoothing circuit and a current monitoring circuit, and converts the supplied power to one suitable for operating the light emitting part 215.

Figure 6:
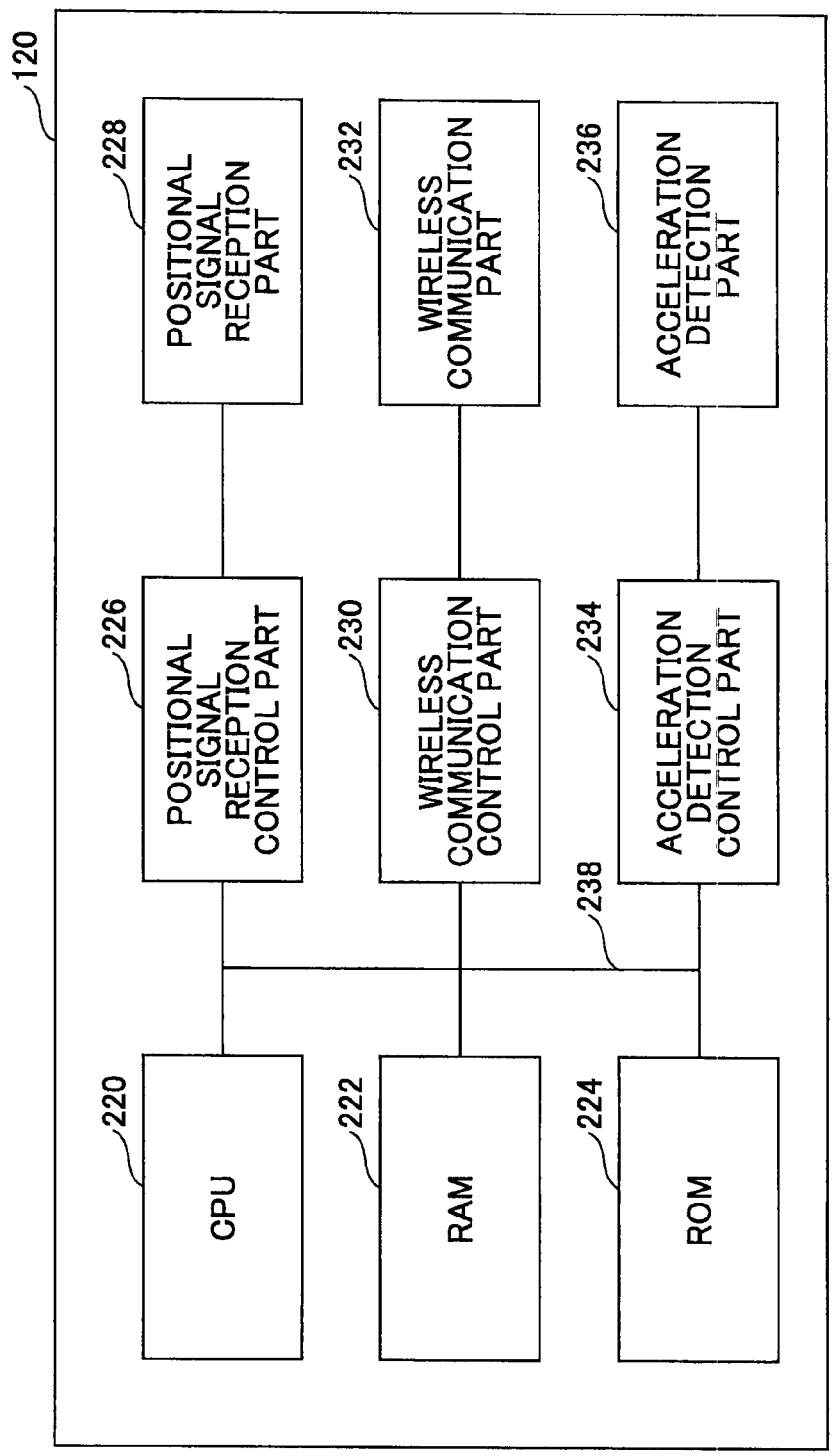
FIG. 6 is a hardware configuration diagram of a wireless terminal according to the first embodiment.

FIG. 6 shows a hardware configuration of the wireless terminal 120 according to the first embodiment, as a typical example of the wireless terminals 120, 122 and 124. Each of the other wireless terminals 122 and 124 has generally the same hardware configuration as the wireless terminal 120. The wireless terminal 120 includes, as shown, a CPU 220, a RAM 222, a ROM 224, a positional signal reception control part 226, a positional signal reception part 228, a wireless communication control part 230, a wireless communication part 232, an acceleration detection control part 234, an acceleration detection part 236 and a bus 238.

The CPU 220 executes a program prepared for carrying out control of the operations of the wireless terminal 120. The RAM 222 provides a work area for the CPU 220, or the like, and stores the positional information received from the lighting fixture 100. The ROM 224 stores the program that the CPU 220 executes and the identification information of the wireless terminal 120. The positional signal reception control part 226 carries out a process for receiving the positioning signal indicating the positional information of the lighting fixture 100 via the positional signal reception part 228. The positional signal reception part 228 is a device including an antenna for receiving the positioning signal such as an IMES signal. The wireless communication control part 230 carries out a wireless communication process using the wireless communication part 232. The wireless communication part 232 is a device including an antenna capable of transmitting and receiving radio waves that meet IEEE 802.15.4 standard, for example. The acceleration detection control part 234 detects a change in the acceleration of the wireless terminal via the acceleration detection part 236. The acceleration detection part 236 includes, for example, an acceleration sensor or a motion sensor that uses inertial force or magnetism. The bus 238 electrically connects these respective parts.

By the above-mentioned configuration, the wireless terminal 120 according to the first embodiment can receive the positional information from the lighting fixture 100 and transmit the own identification information together with the positional information to the lighting fixture 100. Especially, by carrying out the operation of receiving or transmitting in timing when the wireless terminal 120 is moved, it is possible to efficiently transmit the identification information and the positional information.

It is noted that in a case where the wireless terminal 120 is an information terminal such as a smartphone, a PC or the like, an input device such as a touch panel, a dial pad, a keyboard, a mouse and/or the like for receiving the user's input and a corresponding input control part may be provided. Further, a display device such as a display screen and a corresponding display control part may be provided.

Further, in a case where the wireless terminal 120 has a GPS antenna and a corresponding control part, the wireless terminal 120 can receive the positioning signal of IMES using the antenna. Thus, it is possible to adapt the wireless terminal 120 for the positional information management system 1 only by modifying the software.

Further, the acceleration detection control part 234 and the acceleration detection part 236 are optional parts. In a case where the acceleration detection control part 234 and the acceleration detection part 236 are not provided, the operation of receiving or transmitting of the wireless terminal 120 is carried out at predetermined time intervals or at a predetermined time of day.

Further, in a case where, as mentioned above, the positional information is received using the wireless communication control part 230 and the wireless communication part 232, the positional signal reception control part 226 and the positional signal reception part 228 become unnecessary.

Figure 7:
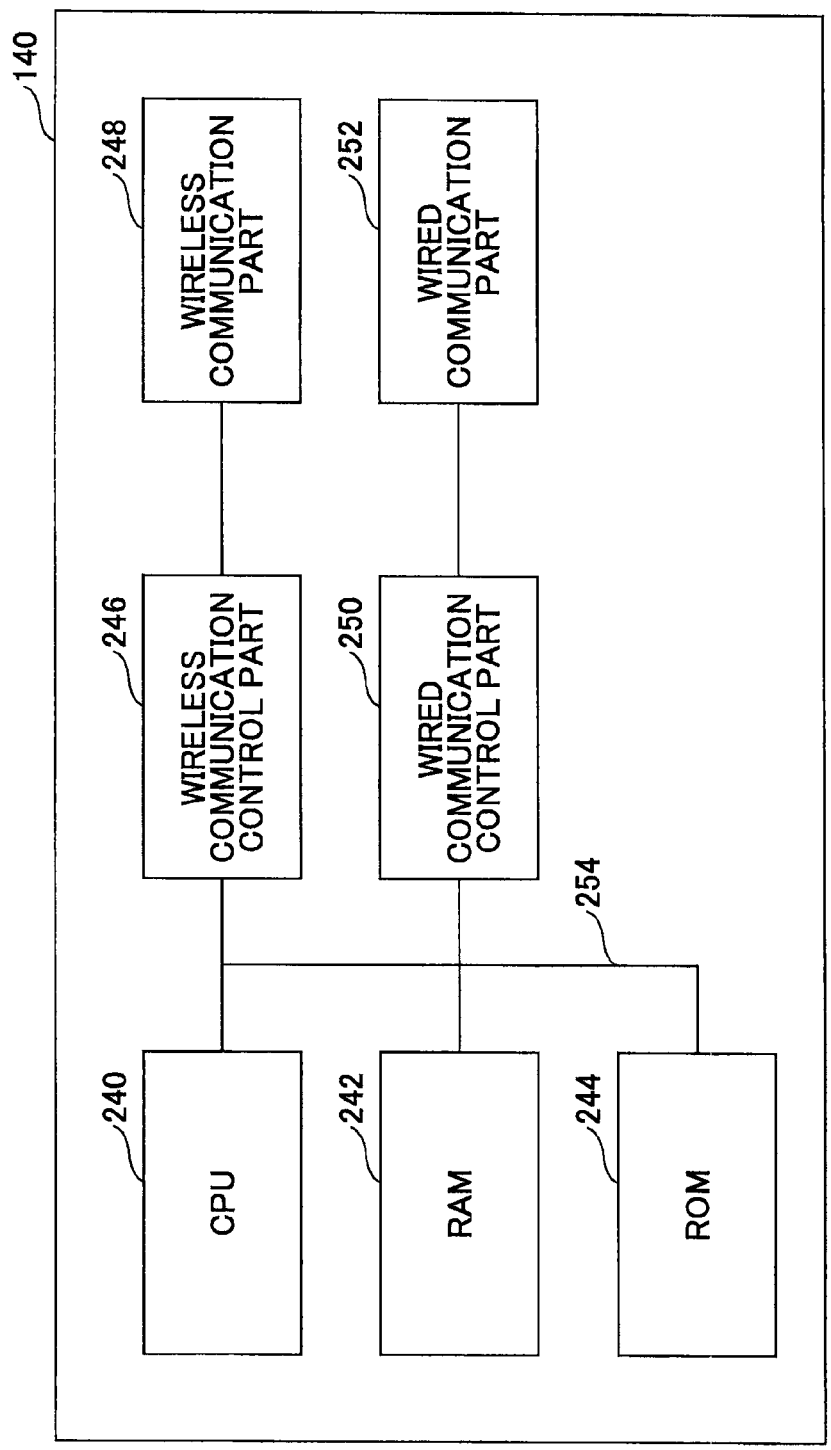
FIG. 7 is a hardware configuration diagram of a management apparatus according to the first embodiment.

FIG. 7 shows a hardware configuration of the management apparatus 140 according to the first embodiment. The management apparatus 140 includes a CPU 240, a RAM 242, a ROM 244, a wireless communication control part 246, a wireless communication part 248, a wired communication control part 250, a wired communication part 252 and a bus 254.

The CPU 240 executes a program prepared for carrying out control of the operations of the management apparatus 140. The RAM 242 provides a work area for the CPU 240, or the like. The ROM 244 stores the program that the CPU 240 executes and data that the CPU 240 uses when executing the program. The wireless communication control part 246 carries out a wireless communication process using the wireless communication part 248. The wireless communication part 248 is a device including an antenna capable of transmitting and receiving radio waves that meet IEEE 802.15.4 standard, for example. The wired communication control part 250 carries out a wired communication process using the wired communication part 252. The wired communication part 252 is a device having a network interface that meets IEEE 802.3 standard, for example. The bus 254 electrically connects these respective parts.

By the above-mentioned configuration, the management apparatus 140 can convert the signals received from the network 180 including the lighting fixtures 100, 102, 104 and 106 and the wireless terminals 120, 122 and 124 to the signals for the network 190 including the management server 160. Further, in a case where the network 180 forming the PAN meets the ZigBee (registered trademark), the management apparatus 140 can have a coordinator function for managing the devices participating in the PAN.

Figure 8:
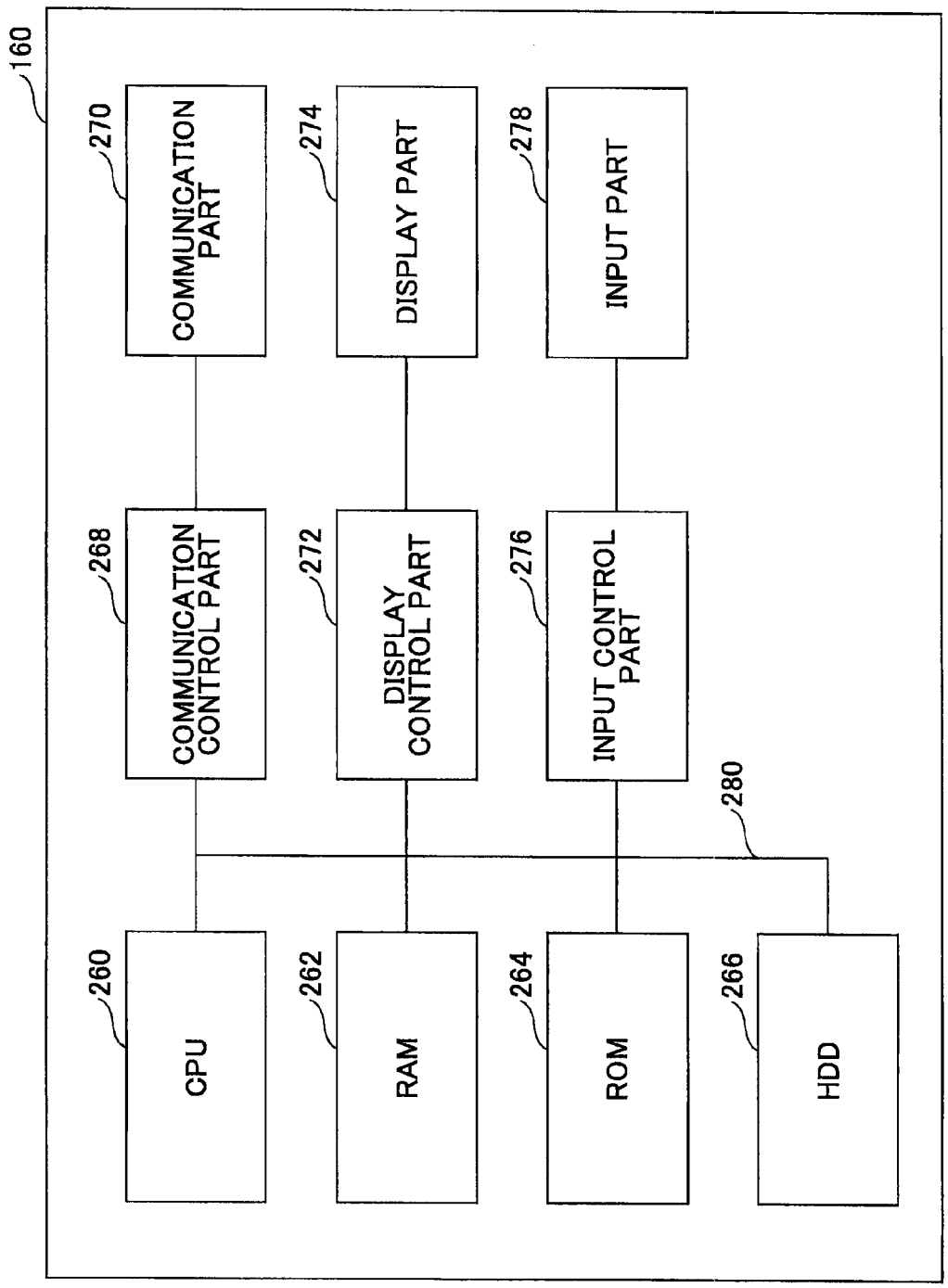
FIG. 8 is a hardware configuration diagram of a management server according to the first embodiment.

FIG. 8 shows a hardware configuration of the management server 160 according to the first embodiment. The management server 160 includes a CPU 260, a RAM 262, a ROM 264, a HDD 266, a communication control part 268, a communication part 270, a display control part 272, a display part 274, an input control part 276, an input part 278 and a bus 280.

The CPU 260 executes a program prepared for carrying out control of the operations of the management server 160. The RAM 262 provides a work area for the CPU 260, or the like. The ROM 264 stores the program that the CPU 260 executes and data that the CPU 260 uses when executing the program. The HDD 266 stores information to be used for managing the positions of the wireless terminals 120, 122 and 124 used in the positional information management system 1. The communication control part 268 carries out a communication process using the communication part 270. The communication part 270 is a device having a network interface that meets IEEE 802.3 standard, for example. The display control part 272 controls the contents to be displayed on the display part 274 according to the contents obtained from the process carried out by the CPU 260 that executes the program concerning the position management to be carried out by the management server 160. The display part 274 includes a display device such as a liquid crystal display device, a CRT display device or the like. The input control part 276 processes the signal given by the input part 278 such as a keyboard, a mouse and/or the like for receiving the user's input. The bus 280 electrically connects these respective parts.

By the above-mentioned configuration, the management server 160 according to the first embodiment can manage the locations (whereabouts) of the wireless terminals 120, 122 and 124 and search for the locations (whereabouts) of the wireless terminals 120, 122 and 124.

It is noted that the HDD 266 may be changed into any other type of storage device such as a tape drive, or a storage area accessible using the network.

Further, the management server 160 may include the wireless communication control part 246 and the wireless communication part 248 of the management apparatus 140, and carry out the processes of the wireless communication control part 246 and the wireless communication part 248, instead of the management apparatus 140. Thereby, it becomes unnecessary to separately provide the management apparatus 140.

(3. Function)

Figure 9:
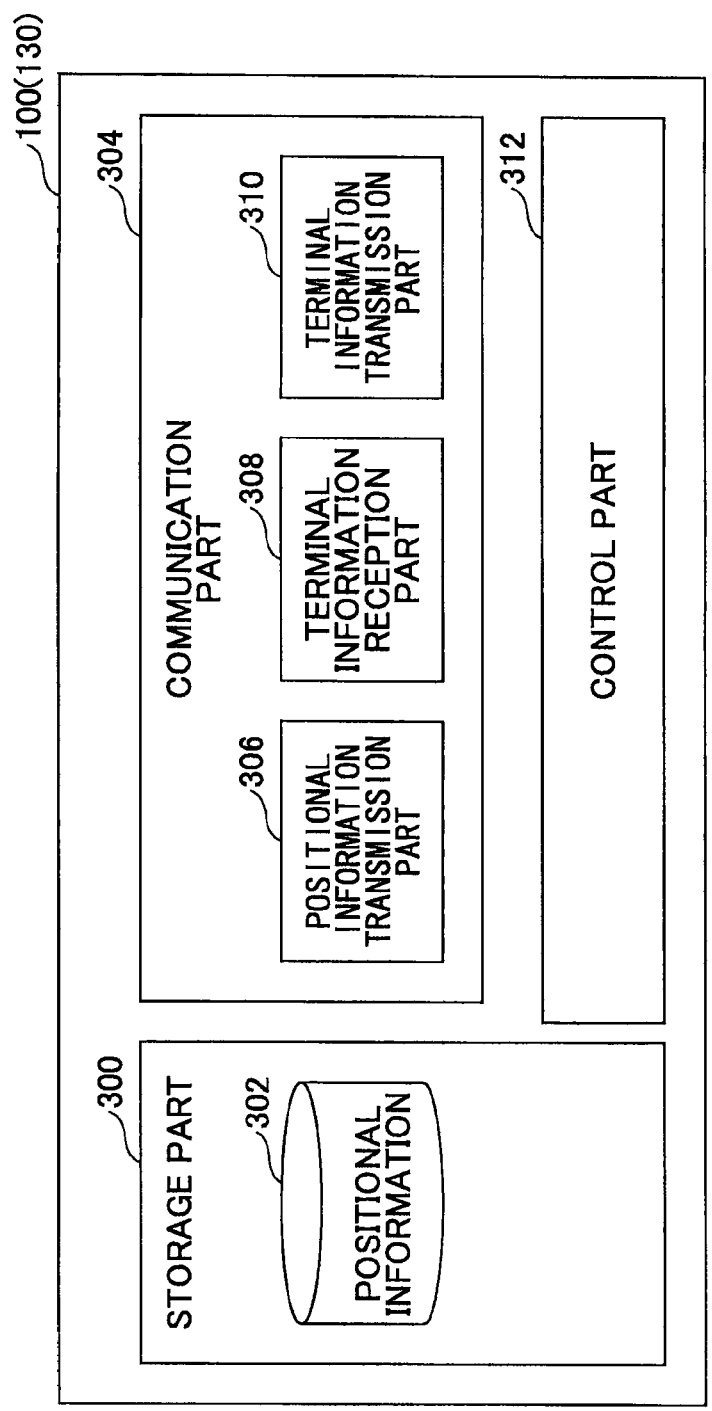
FIG. 9 is a functional block diagram of the lighting fixture according to the first embodiment.

FIG. 9 is a functional block diagram of the lighting fixture 100 according to the first embodiment, as a typical example of the lighting fixtures 100, 102, 104 and 106. Each of the other lighting fixtures 102, 104 and 106 has generally the same functional block configuration as the lighting fixture 100.

The lighting fixture body 130 of the lighting fixture 100 includes a storage part 300, a communication part 304 and a control part 312.

The storage part 300 stores the positional information 302 of the lighting fixture 100 itself. FIG. 13 shows one example of a table for storing the positional information 302. The table of FIG. 13 includes the respective items of "floor number", "latitude", "longitude" and "building number". The floor number denotes the floor number of the floor of the building on which the lighting fixture 100 is installed. The latitude and longitude denote the latitude and longitude of the position at which the lighting fixture 100 is placed. The building number denotes the number of the building in which the lighting fixture 100 is installed. In the example of FIG. 13, the lighting fixture 100 is placed on the sixteenth floor of one of certain buildings having the number "C", at the place of the latitude "35.459555 and the longitude "139.387110".

The communication part 304 includes a positional information transmission part 306, a terminal information reception part 308 and a terminal information transmission part 310.

The positional information transmission part 306 continuously or intermittently transmits, in a wireless manner, the positional information 302 including information such as the latitude and longitude information, the floor number of the building and the number of building, to the wireless terminal 120 that exists within the predetermined area. The positional information 302 is thus transmitted using a format prescribed in IMES, for example. The positional information transmission part 306 is the positional information transmission part 208 included in the lighting fixture body 130, for example.

The terminal information reception part 308 receives the identification information and the positional information transmitted by the wireless terminal 120. The terminal information transmission part 310 then transmits the identification information and the position information transmitted by the wireless terminal 120 to the management server 160 via the management apparatus 140. In a case where the network 180 meets the ZigBee (registered trademark) standard, the transmitting is carried out using the routing information that the lighting fixture body 130 has. The terminal information reception part 308 and the terminal information transmission part 310 are, for example, the wireless communication part 212 included in the lighting fixture body 130.

The control part 312 controls the operations of the lighting fixture body 130. In a case where the lighting fixture 100 forms the PAN that meets the ZigBee (registered trademark) standard together with the other lighting fixtures 102, 104 and 106 and the wireless terminals 120, 122 and 124 and the management apparatus 140, the control part 312 carries out the control such that the lighting fixture body 130 has a router function.

By the above-mentioned configuration, the lighting fixture 100 according to the first embodiment has the positional information 302, transmits the positional information 302 to the wireless terminal 120, receives the identification information of the wireless terminal 120 and the positional information, and transmits the identification information and the positional information to the management server 160 via the management apparatus 140.

It is noted that the positional information 302 includes at least one of the latitude and longitude information of the lighting fixture 100; the floor information of the floor of the building on which the lighting fixture 100 is installed; and the building information of the building in which the lighting fixture 100 is installed. The positional information 302 may include, as the building information, additional information such as the name of the building in which the lighting fixture 100 is installed, information indicating one of divisions inside the room in which the lighting fixture 100 is installed, or the like. Thereby, it is possible to carry out position management more finely.

Figure 10:
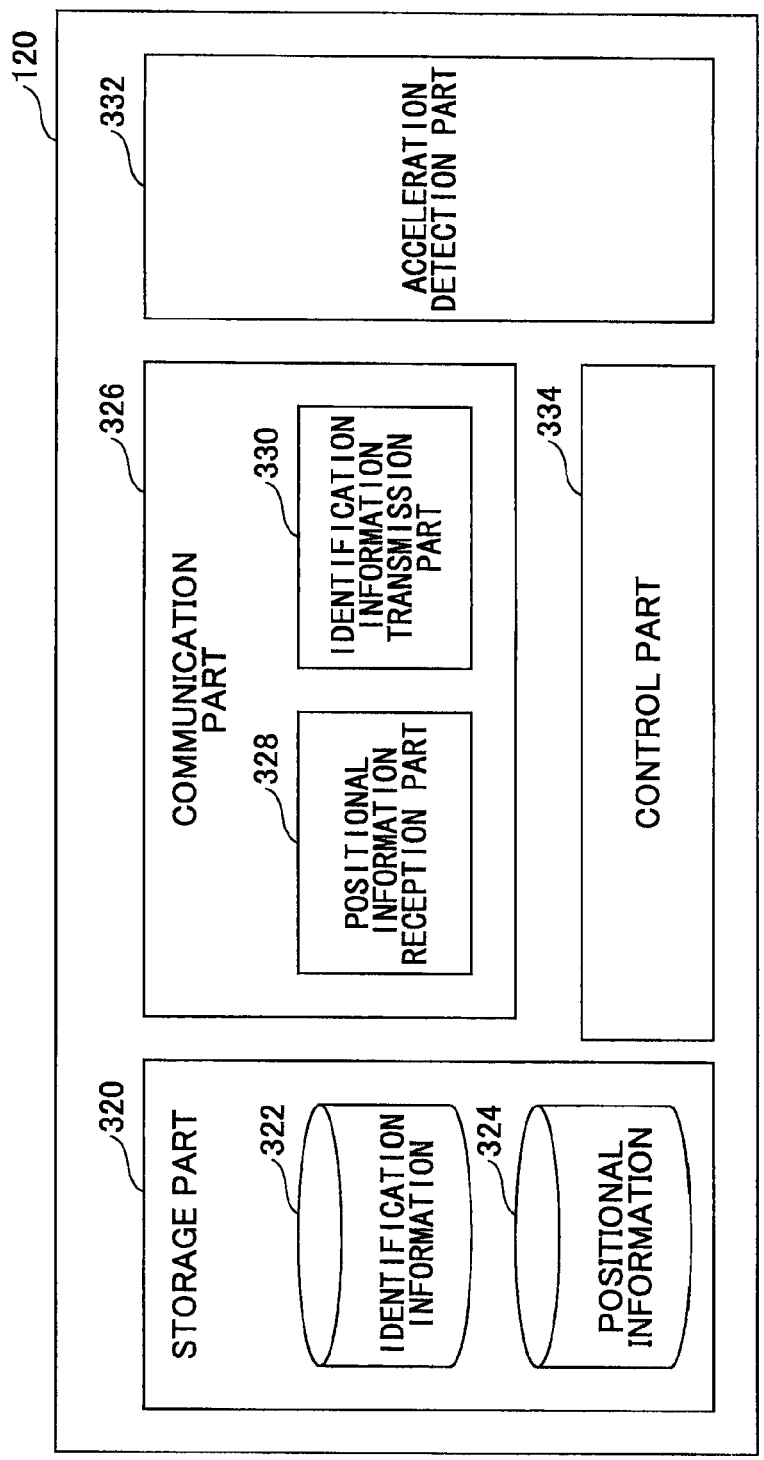
FIG. 10 is a functional block diagram of the wireless terminal according to the first embodiment.

FIG. 10 is a functional block diagram of the wireless terminal 120, as a typical example of the wireless terminals 120, 122 and 124 according to the first embodiment. Each of the other wireless terminals 122 and 124 has generally the same functional block configuration as the wireless terminal 120. The wireless terminal 120 according to the first embodiment includes a storage part 320, a communication part 326, an acceleration detection part 332 and a control part 334.

The storage part 320 includes the identification information 322 and the positional information 324. The identification information 322 includes information such as the network address of the wireless terminal 120 by which it is possible to identify the wireless terminal 120 in the positional information management system 1. For example, in a case where the network 180 meets the IEEE 802.15.4 and ZigBee (registered trademark) standards, it is possible to use the short address of IEEE 802.15.4 or IEEE extended (MAC) address. The positional information 324 is the positional information 302 transmitted by the lighting fixture 100. FIG. 14 shows one example of a table for storing the positional information 324. The configuration of the table of FIG. 14 is the same as FIG. 13.

The communication part 326 includes a positional information reception part 328 and an identification information transmission part 330.

The positional information reception part 328 receives the positional information 302 transmitted by the lighting fixture 100. The received positional information 302 is stored in the storage part 320 of the wireless terminal 120 as the positional information 324.

The identification information transmission part 330 transmits the identification information 322 of the wireless terminal 120 itself and the positional information 324 together to the lighting fixture 100. The positional information 324 is transmitted using a format as shown in FIG. 15, for example. According to the format of FIG. 15, the respective fields of the floor number, the latitude, the longitude and the building number are expressed by 9 bits, 21 bits, 21 bits and 8 bits, respectively, and the format is such that the corresponding fields of the message received according to the IMES standard are connected together. The expression format in each field meets the IMES standard. Actually, in addition to the format of FIG. 15, a header and checksum information prescribed by the applied communication system are added, and then, the positional information 324 is transmitted. As the communication system, the IEEE 802.15.4 and ZigBee (registered trademark) standards are used, for example.

The acceleration detection part 332 detects a change in the acceleration of the wireless terminal 120. A change in the acceleration is thus detected, for example, at a time the wireless terminal 120 starts moving, at a time the wireless terminal 120 stops the moving, at a time an inclination of the wireless terminal 120 has been detected, and so forth.

For example, at a time when the wireless terminal 120 starts moving, the wireless terminal 120 is accelerated, and thus, the acceleration of the wireless terminal 120 is changed from zero to a positive value or from a positive value to zero accordingly. The acceleration detection part 332 detects such a change in the acceleration, and thus, determines that the wireless terminal 120 has started moving.

A change in the acceleration thus detected is used to determine timing of the operation of transmitting or receiving by the wireless terminal 120. It is noted that the acceleration detection part 332 is an optional part.

The control part 334 controls the timing of receiving the positional information by the positional information reception part 328, the timing of transmitting the identification information 322 and the positional information 324 by the identification information transmission part 330. These timings of receiving and transmitting are determined based on the detection of a change of the acceleration of the wireless terminal by the acceleration detection part 332. Alternatively, the timings of receiving and transmitting may be determined based on predetermined time intervals or a predetermined time of day, each of which is previously set in the wireless terminal 120. Further, the respective timings of receiving and transmitting may be determined separately. Further, in a case where the wireless terminal 120 forms the PAN that meets the ZigBee (registered trademark) standard together with the other wireless terminals 122 and 124 and the lighting fixtures 100, 102, 104 and 106 and the management apparatus 140, the control part 334 carries out control such that the wireless terminal 120 has the end device function.

By the above-mentioned configuration, the wireless terminal 120 according to the first embodiment can efficiently receive the positional information from the lighting fixture 100 and efficiently transmit the identification information together with the positional information to the lighting fixture 100.

It is noted that in a case where the wireless terminal 120 is an information terminal such as a smartphone or a PC, the wireless terminal 120 may include an input part for receiving the user's input and/or a display part for showing information to the user. Thereby, the wireless terminal 120 can show the identification information or the positional information to the user, or can receive an input or a change of the identification information or the positional information from the user.

Figure 11:
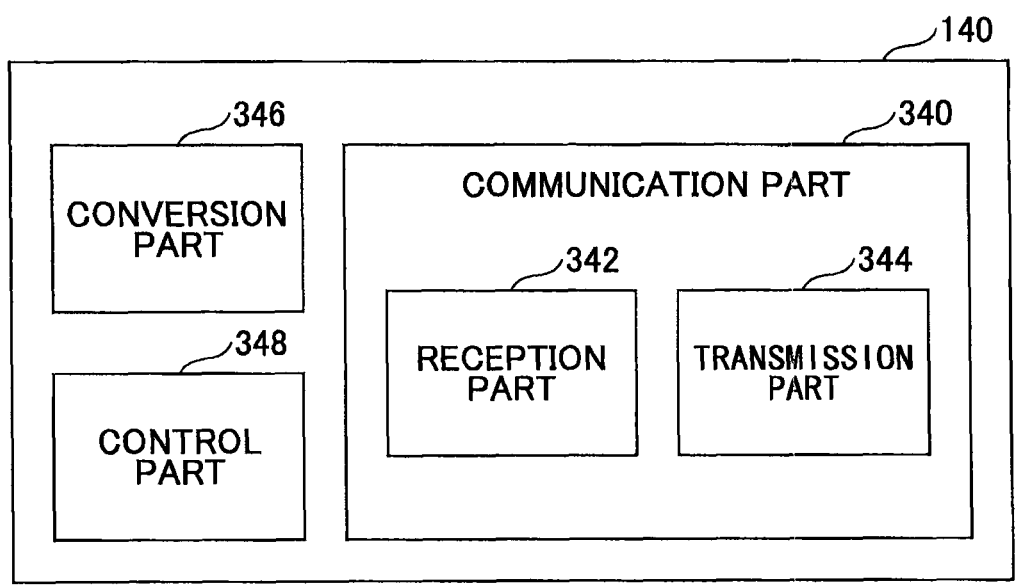
FIG. 11 is a functional block diagram of the management apparatus according to the first embodiment.

FIG. 11 is a functional block diagram of the management apparatus 140 according to the first embodiment. The management apparatus 140 according to the first embodiment includes a communication part 340, a conversion part 346 and a control part 348.

The communication part 340 includes a reception part 342 and a transmission part 344. The reception part 342 receives the data transmitted by the lighting fixtures 100, 102, 104 and 106 or the wireless terminals 120, 122 and 124, which belong to the network 180. The transmission part 344 transmits the data that has been converted in the management apparatus 140 to the management server 160 that belongs the network 190. The network 180 is, for example, the PAN that meets IEEE 802.15.4 and ZigBee (registered trademark) standards. The network 190 is, for example, the LAN that meets IEEE 802.3 standard.

The conversion part 346 converts the data received from the network 180 by the reception part 342 into a form suitable for the network 190. The data obtained from the conversion is then transmitted to the management server 160 via the network 190 by the transmission part 344. In a case where the identification information of the wireless terminal 120, 122 or 126 included in the data is expressed by the short address of IEEE 802.15.4, the identification information is converted into the IEEE extended address based on the information used at the time of configuring the PAN.

The control part 348 controls the operations of the management apparatus 140. In a case where the management apparatus 140 forms the PAN that meets the ZigBee (registered trademark) standard together with the lighting fixtures 100, 102, 104 and 106 and the wireless terminals 120, 122 and 124, the control part 348 carries out control such that the management apparatus 140 has a coordinator function.

By the above-mentioned configuration, the management apparatus 140 according to the first embodiment can bridge between the network 180 to which the lighting fixtures 100, 102, 104 and 106 and the wireless terminals 120, 122 and 124 belong and the network 190 to which the management server 160 belongs, for making it possible to carry out communication therebetween.

Figure 12:
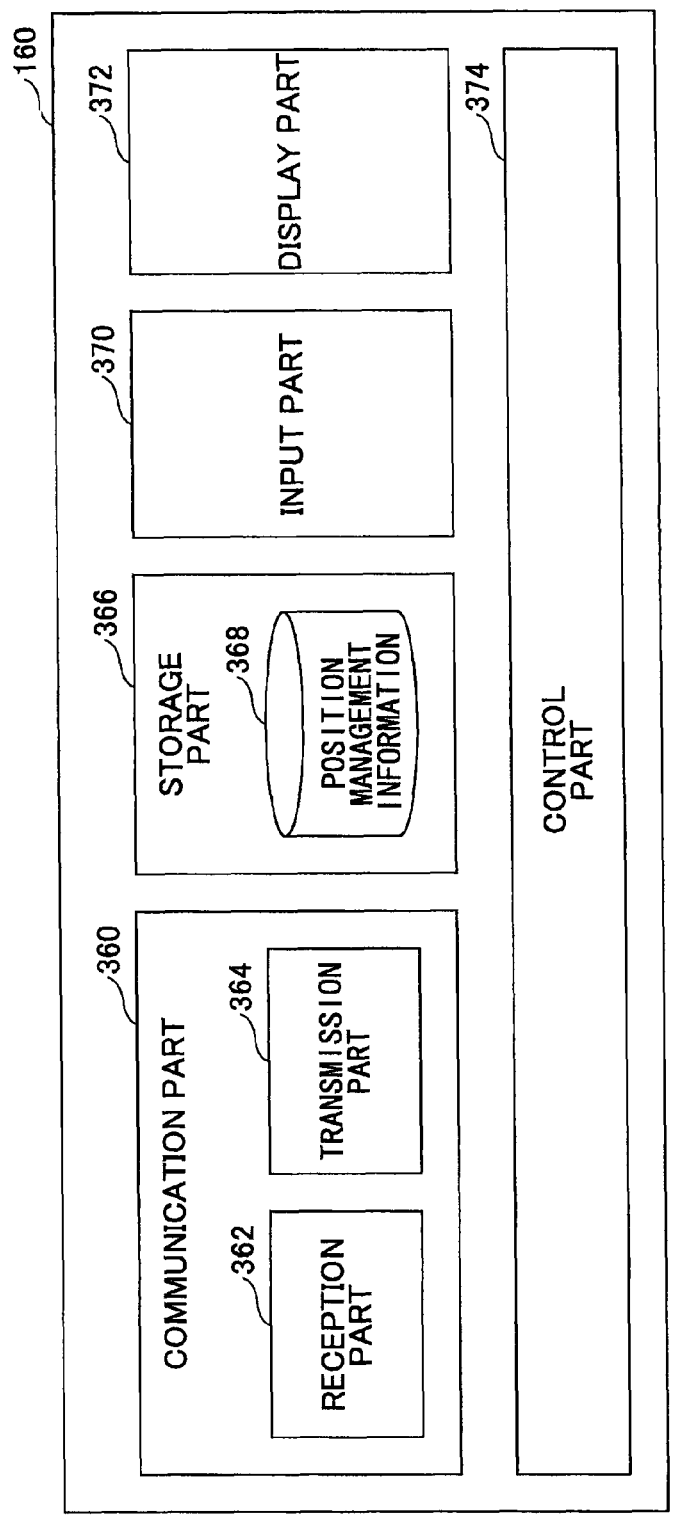
FIG. 12 is a functional block diagram of the management server according to the first embodiment.

FIG. 12 is a functional block diagram of the management server 160 according to the first embodiment. The management server 160 according to the first embodiment includes a communication part 360, a storage part 366, an input part 370, a display part 372 and a control part 374.

The communication part 360 includes a reception part 362 and a transmission part 364. The reception part 362 receives the identification information and the positional information transmitted from the wireless terminals 120, 122 and 124 via the management apparatus 140. The identification information and the positional information thus received are stored in the storage part 366. The transmission part 364 transmits the corresponding positional information to an external server or the like in a case where the positional information is requested by the external server or the like.

The storage part 366 has position management information 368. The position management information 368 is information obtained from adding management information such as the received date and time to the identification information and the positional information received from the wireless terminals 120, 122 and 124. FIG. 16 shows one example of a table for storing the position management information 368. The table of FIG. 16 has items of "identification information", "apparatus name", "department", "latitude", "longitude", "floor number", "building" and "received date and time". The item "identification information" is an item for the identification information such as the IEEE extended address of the wireless terminal 120, 122 or 124, which has transmitted the identification information. The items "latitude", "longitude", "floor number" and "building" ("building number") are items for those corresponding to the positional information received together with the identification information. The item "received date and time" is an item for information indicating the date and time at which the management server 160 has received the information. The item "apparatus name" is an item for information indicating the name of the management target to which the wireless terminal 120, 122 or 124, which has transmitted the information, is attached, or the apparatus name of the wireless terminal 120, 122 or 124, which has transmitted the information, itself. The item "department" is an item for information indicating the name of the department that has the wireless terminal 120, 122 or 124, which has transmitted the information. The information "apparatus name" and the information "department" are previously associated with the corresponding identification information by the management server 160.

The input part 370 receives the user's input so that the user can obtain the positional information (search for the position).

Figure 19:
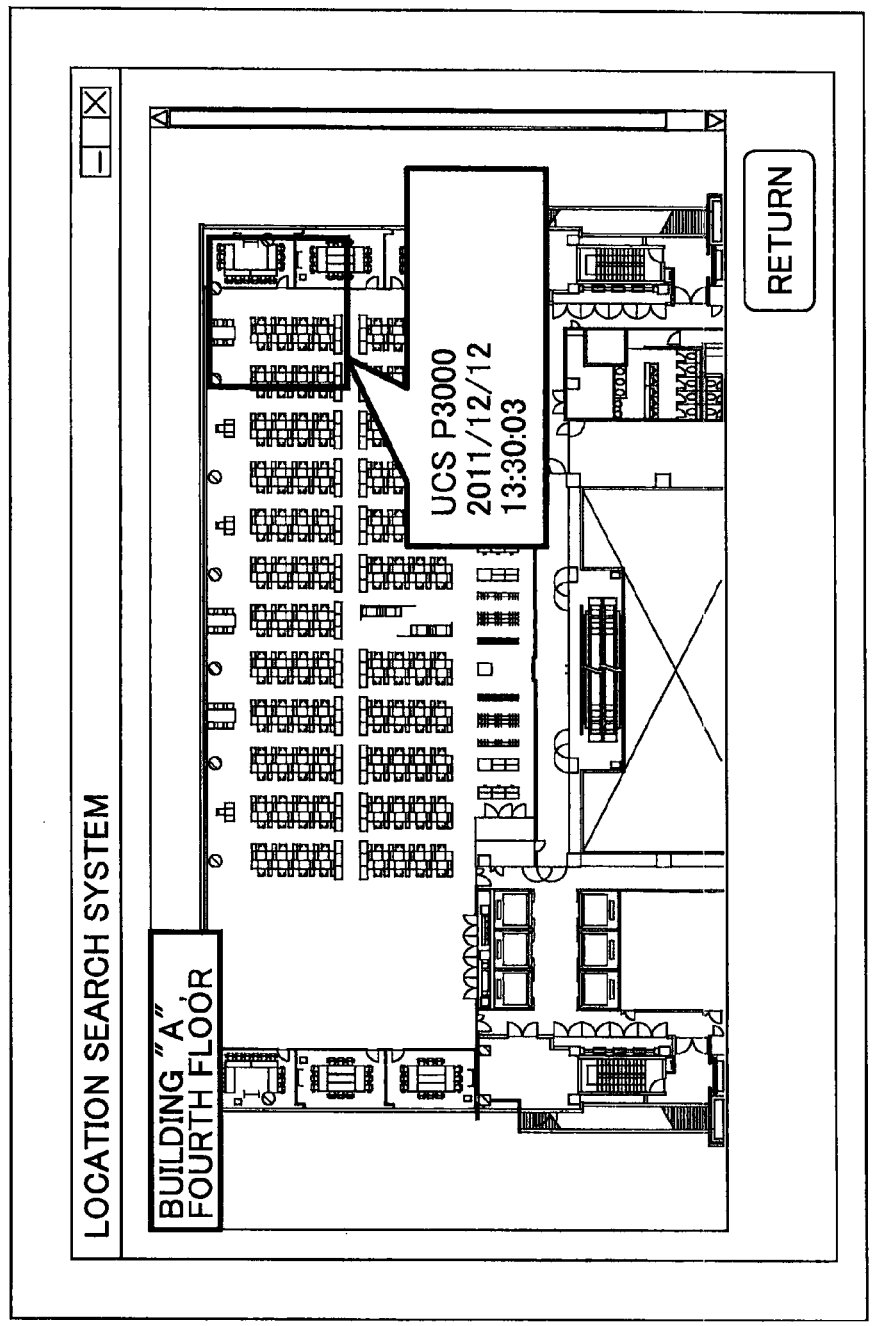
FIG. 19 shows an example of a search result screen page of the management server according to the first embodiment.

The display part 372 displays a GUI of a search screen page for the user to search for the position (obtain the positional information) on the display screen. FIG. 18 shows one example of the search screen page. According to a "location search system" shown in FIG. 18, a list of "departments" and "apparatus names" concerning the wireless terminals is displayed based on the information stored in the storage part 366. Then, when the user selects the check box of the apparatus to be searched for using the input part 370, a check mark is generated at the selected check box, as shown in FIG. 18. FIG. 18 shows an example in which the user wishes to carry out a search for the apparatus having the apparatus name "UCS P3000" that the "sales dept. 1" has. When the user presses a "search execution" button on the search screen page of FIG. 18 after the user has selected all the apparatuses to be searched for and the check marks have been generated at the corresponding check boxes accordingly, the corresponding search is carried out, and the search screen page is switched into a screen page showing a search result. FIG. 19 shows one example of the screen page of a search result. That is, when the "search execution" button has been pressed as mentioned above, the display part 372 displays the floor diagram of "building "A", fourth floor" on which "UCS P3000" is placed, the apparatus name "UCS P3000" and the received date and time "2011/12/12 13:30: 03", as shown in FIG. 19, based on the information stored in the storage part 366 (see FIG. 16).

The control part 374 controls the operations of the management server 160.

By the above-mentioned configuration, the management server 160 according to the first embodiment can manage the positions of the wireless terminals 120, 122 and 124, and search for the locations (whereabouts) thereof. Especially, the management server 160 can directly receive and manage the information itself which indicates the positions themselves of the wireless terminals 120, 122 and 124. Thus, it is possible to reduce the calculation amount required for searching for the positions.

It is noted that the management server 160 may have the same functions as those of the conversion part 346, the control part 348 and the reception part 342 that the management apparatus 140 has, and thus, have the same functions as those of the management apparatus 140. Thereby, it becomes unnecessary to separately provide the management apparatus 140.

Further, the position management information 368 stored by the management server 160 may include, in addition to the information shown in FIG. 16 or instead thereof, information that includes the date and time at which the wireless terminal 120, 122 or 124 has transmitted the information, the identifier of the lighting fixture 100, 102, 104 or 106, or the management apparatus 140 by which the information has been relayed, and/or the time period(s) or the transmission electric field strength(s) at the wireless terminal 120, 122 or 124 and/or the lighting fixture 100, 102, 104 or 106 required until the information has arrived at the management server 160. Thereby, it is possible to manage the positional information under the more detailed conditions.

Further, the management server 160 may store the past positional information of the wireless terminals 120, 122 and 124. Thereby, it is possible to track the movements of the wireless terminals 120, 122 and 124.

(4. Operational Sequence)

Figure 17:
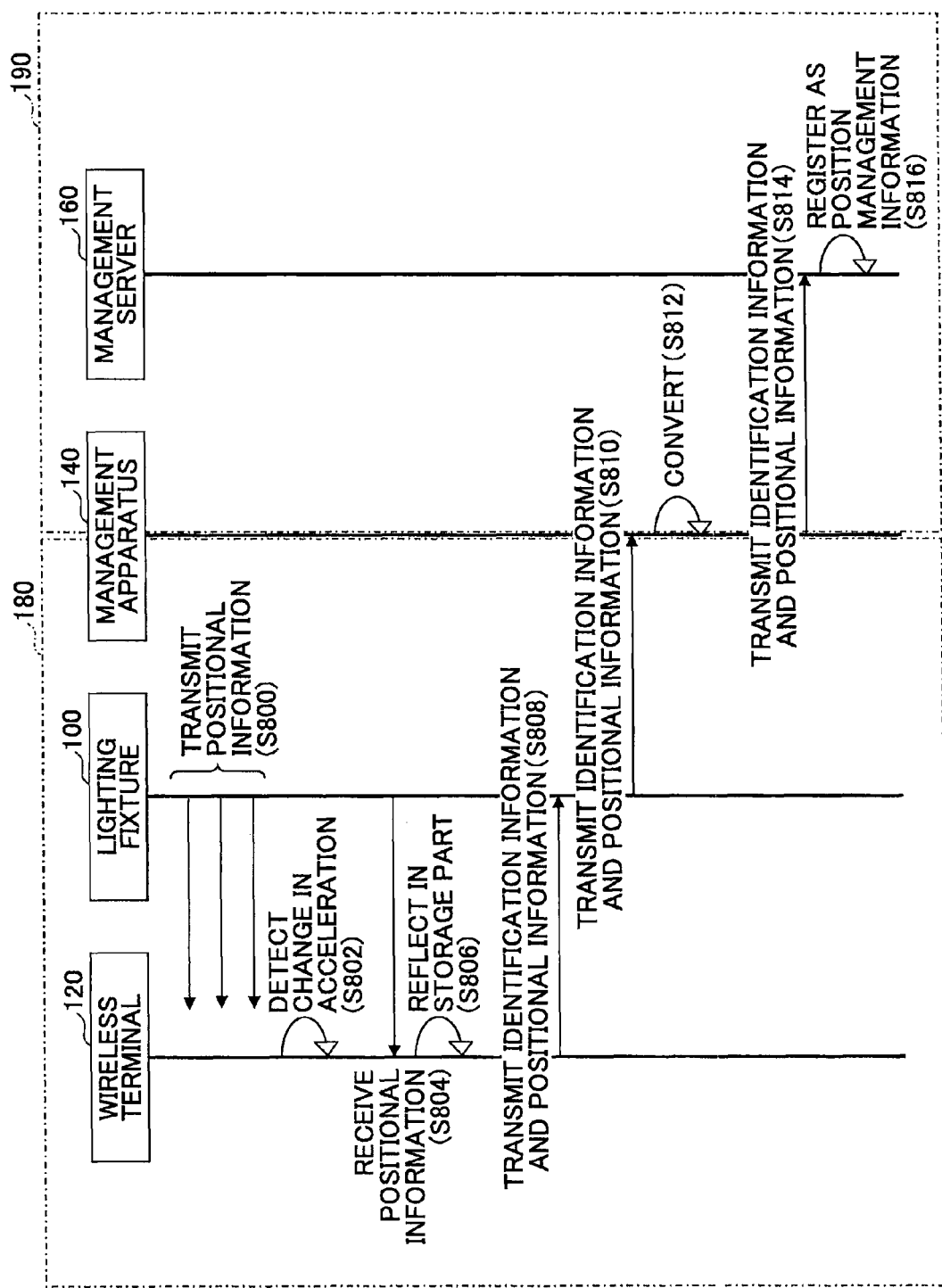
FIG. 17 shows an operational sequence of the positional information management system according to the first embodiment.

FIG. 17 shows an operational sequence of the positional information management system 1 according to the first embodiment. Using FIG. 17, an example will be described in which the positional information management system 1 includes the wireless terminal 120 that receives the positional information when having detected a change in the acceleration of the wireless terminal, and transmits the identification information; the lighting fixture 100 that transmits the positional information to the zone to which the wireless terminal 120 belongs; the management apparatus 140 that bridges between the PAN (IEEE 802.15.4 and ZigBee (registered trademark)) and the LAN (IEEE 802.3); and the management server 160. Further, it is assumed that the PAN between the lighting fixture 100, the wireless terminal 120 and the management apparatus 140 has been already configured.

In step S800, the lighting fixture 100 continuously or intermittently transmits the positional information using IMES or the like.

In step S802, the wireless terminal 120 detects a change in the acceleration of the wireless terminal.

In step S804, the wireless terminal 120 receives the positional information transmitted by the lighting fixture 100.

In step S806, the wireless terminal 120 stores the received positional information.

In step S808, the wireless terminal 120 transmits the identification information and the positional information to the lighting fixture 100.

In step S810, the lighting fixture 100 transmits the identification information and the positional information, received from the wireless terminal 120, to the management apparatus 140 via the minimum path (route).

In step S812, the management apparatus 140 converts the data transmitted from the network 180, including the identification information and the positional information received from the lighting fixture 100, into a form suitable for the network 190.

In step S814, the management apparatus 140 transmits the identification information and the positional information, converted into the form suitable for the network 190, to the management server 160.

In step S816, the management server 160 registers the identification information and the positional information received from the management apparatus 140 together with the information of the wireless terminal 120 corresponding to the identification information.

By this procedure, in the positional information management system 1, the wireless terminal 120 efficiently transmits the identification information and the positional information to the nearest lighting fixture 100, and thus, it is possible to reduce the power consumption of the wireless terminal 120.

It is noted that, as described above, it is possible to integrate the functions of the management apparatus 140 into the management server 160 so that the management server 160 also carries out the functions of the management apparatus 140. In this case, it becomes unnecessary to install the separate management apparatus 140.

Further, in a case where the wireless terminal 120 does not have the acceleration detection part 332, step S802 is not carried out, and the receiving of the positional information in step S804 can be carried out at a predetermined time of day or at predetermined time intervals. The process thereafter is the same as steps S806 to S816.

According to the embodiment, it is possible to provide the lighting fixture for which the introduction cost and the running cost can be reduced and by which it is possible to efficiently carry out positional information management.

Although the embodiments of the lighting fixture and the positional information management system have been described, the present invention is not limited to the specifically disclosed embodiments, and variations and modifications may be made without departing from the scope of the present invention.

The present application is based on and claims the benefit of priority of Japanese Priority Application No. 2012-133279 filed on Jun. 12, 2012, the entire contents of which are hereby incorporated herein by reference.

What is claimed is:

1. A positional information management system comprising:
    a plurality of lighting fixtures each having corresponding positional information, a corresponding lighting fixture body and a corresponding light device mounted in the corresponding lighting fixture body;
    a wireless terminal configured to,
        receive the corresponding positional information from one or more of the plurality of lighting fixtures, and
        transmit the received positional information and identification information to a corresponding one of the one or more lighting fixtures; and
    a management apparatus configured to receive the positional information and the identification information from the one or more of the plurality of lighting fixtures,
    wherein the lighting fixture body includes a processor configured to,
    transmit the positional information of the one or more of the plurality of lighting fixture to the wireless terminal;
    receive, from the wireless terminal that has received the positional information, the identification information of the wireless terminal and the positional information;
    transmit the identification information and the positional information to the management apparatus via a minimum path between a corresponding one of the plurality of lighting fixtures and the management apparatus, to be transmitted to a management server configured to manage a position of the wireless terminal;
    convert a voltage supplied by an external power source, and
    supply the converted voltage to the lighting fixture body.

2. The positional information management system as claimed in claim 1, wherein
    the management apparatus is configured to manage the positional information of at least one of the one or more of the plurality of lighting fixtures and the identification information of the wireless terminal to be associated with each other to provide information indicating that the position of the wireless terminal corresponds to a position of the at least one of the one or more of the plurality of lighting fixtures.

3. The positional information management system as claimed in claim 1, wherein the processor is configured to transmit the positional information using a communication system that is configured to enable indoor positioning.

4. The positional information management system as claimed in claim 1, wherein the positional information includes at least one of latitude and longitude coordinates of the one or more of the plurality of lighting fixtures, information corresponding to a floor of a building on which the one or more of the plurality of lighting fixtures are placed, and information corresponding to the building in which the one or more of the plurality of lighting fixtures are placed.

5. The positional information management system as claimed in claim 1, wherein the minimum path is a shortest one of a plurality of paths between the corresponding one of the plurality of lighting fixtures and the management apparatus.

6. The positional information management system as claimed in claim 5, wherein
   the plurality of paths are paths formed between elements of a network, and
   the elements of the network include the plurality of lighting fixtures, the management apparatus and the wireless terminal.

* * * * *